US011414587B2

United States Patent
Jones et al.

(10) Patent No.: US 11,414,587 B2
(45) Date of Patent: Aug. 16, 2022

(54) CYCLOALKENE AND TRANSITION METAL COMPOUND CATALYST RESIN FOR WELL SEALING

(71) Applicant: Halliburton Energy Services, Inc., Houston, TX (US)

(72) Inventors: Paul Joseph Jones, Houston, TX (US); Samuel Jason Lewis, Houston, TX (US); Mikhail Tcibulskii, Moscow (RU)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/117,645

(22) Filed: Dec. 10, 2020

(65) Prior Publication Data

US 2021/0363401 A1 Nov. 25, 2021

Related U.S. Application Data

(60) Provisional application No. 63/029,022, filed on May 22, 2020.

(51) Int. Cl.
| | |
|---|---|
| *E21B 33/138* | (2006.01) |
| *C09K 8/44* | (2006.01) |
| *C09K 8/42* | (2006.01) |
| *C04B 26/04* | (2006.01) |
| *C04B 28/02* | (2006.01) |

(52) U.S. Cl.
CPC .............. *C09K 8/44* (2013.01); *C04B 26/04* (2013.01); *C04B 26/045* (2013.01); *C04B 28/02* (2013.01); *C09K 8/426* (2013.01); *E21B 33/138* (2013.01)

(58) Field of Classification Search
CPC ....... C04B 26/04; C04B 28/02; E21B 33/138; C09K 8/426; C09K 8/44
See application file for complete search history.

(56) References Cited

U.S. PATENT DOCUMENTS

| | | |
|---|---|---|
| 5,312,940 A | 5/1994 | Grubbs et al. |
| 6,610,626 B2 | 8/2003 | Grubbs et al. |
| 6,759,537 B2 | 7/2004 | Grubbs et al. |
| 7,032,667 B2 | 4/2006 | Halliburton |
| 8,551,244 B2 | 10/2013 | Le Roy-Delage et al. |
| 8,844,628 B2 | 9/2014 | Le Roy-Delage et al. |
| 9,683,161 B2 | 6/2017 | Le Roy-Delage et al. |
| 10,457,848 B2 | 10/2019 | Le Roy-Delage et al. |
| 11,035,195 B2 * | 6/2021 | Meeks .................. E21B 21/003 |
| 2003/0186035 A1 | 10/2003 | Cruce et al. |

(Continued)

FOREIGN PATENT DOCUMENTS

| | | |
|---|---|---|
| WO | 2016-057027 | 4/2016 |
| WO | 2018-057332 | 3/2018 |

OTHER PUBLICATIONS

Halliburton—Epseal Sealant MSDS—Jan. 4, 2011.

(Continued)

*Primary Examiner* — Silvana C Runyan
(74) *Attorney, Agent, or Firm* — Thomas Rooney; C. Tumey Law Group PLLC (57) ABSTRACT

A method may include introducing into a wellbore a resin-based sealant composition comprising: a resin comprising a cycloalkene; and a transition metal compound catalyst; and allowing the resin-based sealant composition to harden in the wellbore.

18 Claims, 6 Drawing Sheets

(56) References Cited

U.S. PATENT DOCUMENTS

| | | | |
|---|---|---|---|
| 2010/0087600 A1* | 4/2010 | Muller | B01J 31/2273 525/245 |
| 2013/0079261 A1* | 3/2013 | Hutchison | C07C 6/04 507/259 |
| 2013/0220883 A1* | 8/2013 | Mazyar | C10G 1/045 208/44 |
| 2015/0267103 A1 | 9/2015 | Medvedev | |
| 2016/0257779 A1 | 9/2016 | Cruce et al. | |
| 2017/0081933 A1* | 3/2017 | Nedwed | E21B 33/064 |

OTHER PUBLICATIONS

Halliburton—WellLock Resin Rigless Micro Channel Remediation H011331—Accessed Jul. 8, 2021.
M&D Industries of LouisianaM&D Industries of Louisiana—Liquid Bridge Plug—Accessed Jul. 8, 2021.
Wellcem—ThermaSet—This is how we dealt with a leaking liner lap—Nov. 28, 2018.
Wild Well Control—ControlSEAL—A Long Term Barrier Resin Sealant Oilfield Technology—Sep. 25, 2019.
International Search Report and Written Opinion for Application No. PCT/US2020/066296, dated Apr. 16, 2021.

* cited by examiner

CYCLOALKENE AND TRANSITION METAL COMPOUND CATALYST RESIN FOR WELL SEALING

BACKGROUND

During well construction, such as well completion, casing may be used to line a wellbore hole from the start of drilling to the end. A series of threaded couplings may connect each joint of casing which may run the length of the wellbore. Cement may be used to secure and support well casing in the wellbore and may prevent fluid interface between various fluid layers underground, or the production or transportation of unwanted fluids into the well.

Over a period of time, the well casing may be worn due to corrosion, erosion, or wear fatigue of ongoing wellbore operations. The casing may have a defect such as a casing leak. The well may allow gas migration which may affect production and integrity of the wellbore. Such casing leaks may result in pressure test failures. Sustained casing pressure may be a result of gas flow from a subterranean geological formation on the outside of the casing, which allow gas to flow through channels in the cement sheath. Wellbore operations to repair casing and sustained casing pressure may involve injecting a sealant into a tight channel. Various sealant compositions may be used to remediate the worn or damaged casing as well as the cement sheath. There may be limited success to cement slurries or other particle-laden service fluids due to particle deposits and particle bridging at entrances of the channels. A solids-free, resin-based sealant system may help with wellbore stabilization and may be used to regain wellbore architecture integrity by decreasing the occurrence of particle bridging. Resin-based sealant compositions may have increased flexibility and toughness as compared to conventional cement compositions, the resin-based sealant composition may be used, for example, in applications where increased stresses and/or increased number of stress cycles may be encountered. However, various solids-free, resin-based sealants such as epoxy resins may have limited performance due to viscosity and reactivity limitations at temperatures below 38° C. (100° F.). Further, epoxide-based resins may become problematic when the treatment zone of the wellbore is near the surface in a land well or the mudline in an offshore well.

BRIEF DESCRIPTION OF THE DRAWINGS

These drawings illustrate certain aspects of the present disclosure and should not be used to limit or define the disclosure.

DETAILED DESCRIPTION

The present disclosure may relate to subterranean wellbore operations, and more particularly, to resin-based sealant compositions and methods of use in servicing wellbores. Resin-based sealant compositions may comprise a resin and a transition metal compound catalyst. Upon mixing the resin and the transition metal compound catalyst to form the resin-based sealant composition, the resin-based sealant compositions may irreversibly set to form a rigid solid. The set time and ultimate strength may be chemically adjusted dependent on the wellbore application. Some resin sealants, such as epoxide-based resins, may have high viscosity and exhibit rapid thickening in relatively colder temperatures and at such temperatures may set to form a solid with undesirable physical properties including low tensile and low compressive strength. As such, epoxide-based resins may not be suitable for some downhole locations where the temperature range exceeds the operational temperature of the epoxide-based resin. However, the resin-based sealant composition of the present application may be formulated to low temperatures. Resin-based sealant compositions described herein may be used in a variety of wellbore applications including, but not limited to wellbore remediation, zonal isolation, and cementing. A variety of different sealant compositions, including non-cementitious sealants, such as resin-based sealant compositions may be used in casing remediation. However, a resin-based sealant composition with increased reactivity at temperatures below at temperatures below 38° C. (100° F.) may be preferred.

A resin-based sealant composition may include a resin that can undergo a ring-opening metathesis polymerization (ROMP) reaction. Resin molecules that undergo ROMP may polymerize by forming new carbon-carbon bonds between molecules. Once the polymerization reaction is initiated, the reaction may proceed rapidly to transform the resin-based sealant composition from a liquid to a solid. During the reaction, heat may be released which may raise the temperature of the resin-based sealant composition, however, the heat generated may not be sufficient to char or degrade the final set product. The resin in the resin-based sealant composition may be pumpable below 38° C. (100° F.) without additional solvents present. Further, the resin may have a density greater than water and a viscosity that may be ideal for deep penetration into channels and efficient squeezes for defects such as gas migration or casing leaks.

The resin included in the resin-based sealant composition may include a cycloalkene, which may be a cycloalkadiene, that may undergo a ring-opening metathesis polymerization reaction transforming the resin-based sealant composition into a hardened mass. The cycloalkene may have no aromatic character. The cycloalkene may include, but is not limited to cyclopentadiene, dicyclopentadiene, tricyclopentadiene, cyclobutadiene, cyclohexadiene, terpinene, norbornadiene, isomers thereof, and combinations thereof. The cycloalkene may also be substituted or unsubstituted cycloalkadienes. Substituted cycloalkadienes may be substituted with a hydrocarbyl group or any other suitable organic functional group. The cycloalkene may be present at a point in a range of about 50 wt. % to about 99.5 wt. % of the resin-based sealant composition. Alternatively, the cycloalkene may be present at a point in a range of about 50 wt. % to about 60 wt. %, at a point in a range of about 60 wt. % to about 70 wt. %, at a point in a range of about 70 wt. % to about 80 wt. %, at a point in a range of about 80 wt. % to about 90 wt. %, at a point in a range of about 90 wt. % to about 99.5 wt. %. or any ranges therebetween.

The resin-based sealant composition may include a transition metal compound catalyst where the transition metal compound catalyst may include a substituted or unsubstituted metal carbene compound comprising a transition metal and an organic backbone. Some non-limiting examples of the transition metal compound catalyst may include, but not are limited to a Grubbs Catalyst® and Schrock catalysts. The Grubbs Catalyst® may include ruthenium alkylidene or osmium alkylidene and Schrock catalyst may include molybdenum. Selection of a transition metal compound catalyst may affect the polymerization rate. The transition metal compound catalyst may be present in the resin-based sealant compositions at a point in a range of about 0.001 wt. % to about 20 wt. %. Alternatively, the transition metal compound catalyst may be present at a point in a range of about 0.001 wt. % to about 1 wt. %, at a point in a range of about 1 wt. % to about 5 wt. %, at a point in a range of about 5 wt. % to about 10 wt. %, at a point in a range of about 10 wt. % to about 15 wt. %, at a point in a range of about 15 wt. % to about 20 wt. %, or any ranges therebetween. Alternatively, the resin and the transition metal compound catalyst concentrations may be expressed as a relative mass ratios. For example, the resin and the transition metal compound catalyst may be present in the resin-based sealant composition in a mass ratio of about 50:1 to about 10000:1 resin to transition metal compound catalyst. Alternatively, the resin and transition metal compound catalyst may also be present in mass ratios of about 50:1 to about 100:1, about 100:1 to about 500:1, about 500:1 to about 1000:1, about 1000:1 to about 2000:1, about to 2000:1 to about 3000:1, about 3000:1 to about 4000:1, about 4000:1 to about 5000:1, about 5000:1 to about 6000:1, about 6000:1 to about 7000:1, about 7000:1 to about 8000:1, about 8000:1 to about 9000:1, about 9000:1 to about 10000:1 or any mass ratios therebetween of the resin to the transition metal compound catalyst. Alternatively, the transition metal compound catalyst may be suspended in a mineral oil suspension, or any suitable suspension medium. For example, the suspension medium may be present in the transition metal compound catalyst suspension in an amount of about 90% to 99% of the transition metal compound catalyst suspension. Alternatively, the suspension medium may be present in amount of about 90% to about 92%, about 93% to about 95%, and about 96% to about 99%. The resin and the transition metal compound catalyst suspension concentrations may be expressed as a relative mass ratios. For example, the resin and the transition metal compound catalyst suspension may be present in the resin-based sealant composition in a mass ratio of about 50:1 resin to transition metal catalyst suspension. Alternatively, the resin and transition metal compound catalyst suspension may also be present in mass ratios of about 20:1, about 30:1, about 40:1, about 60:1, about 70:1, or about 80:1, or any mass ratios therebetween of the resin to the transition metal compound catalyst suspension. Specific examples of suitable transition metal compound catalysts will be described in detail below.

The transition metal compound catalyst may have the general chemical structure depicted in Structure 1. M may be either ruthenium or osmium. R and R1 may be independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl. The selected R and R1 may be optionally substituted with C1-C5 alkyl, halogen, C1-C5 alkoxy or with a phenyl group further optionally substituted with halogen, C1-C5 alkyl or C1-C5 alkoxy. X and X1 may be the same or different and may be any suitable anionic ligand. L and L1 may any suitable neutral electron donor.

Structure 1

The transition metal compound catalyst may also have the general chemical structure depicted in Structure 2. M may be either ruthenium or osmium. R and R1 may be independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl. The selected R and R1 may optionally be substituted with C1-C5 alkyl, halogen, C1-C5 alkoxy or with a phenyl group further optionally substituted with halogen, C1-C5 alkyl or C1-C5 alkoxy. X and X1 groups may be the same or different and may be any suitable anionic ligand. L2, L3, and L4 may be the same or different, and may be any suitable neutral electron donor ligand, wherein at least one L2, L3, and L4 may be an N-heterocyclic (NHC) carbene ligand as described below.

Structure 2

The transition metal compound catalyst may also have the general chemical structure depicted in Structure 3. M may be either ruthenium or osmium. R and R1 may be independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl. The selected R and R1 may optionally be substituted with C1-C5 alkyl, halogen, C1-C5 alkoxy or with a phenyl group further optionally substituted with halogen, C1-C5 alkyl or C1-C5 alkoxy. X and X1 may be the same or different and may be any suitable anionic ligand. NHC may be any N-heterocyclic carbene (NHC) ligand as described below.

Structure 3

The transition metal compound catalyst may also have the general chemical structure depicted in Structure 4. M may be either ruthenium or osmium. R and R1 may be independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl. The selected R and R1 may optionally be substituted with C1-C5 alkyl, halogen, C1-C5 alkoxy or with a phenyl group further optionally substituted with halogen, C1-C5 alkyl or C1-C5 alkoxy. X and X1 may be the same or different and may be any suitable anionic ligand. NHC may be any N-heterocyclic carbene (NHC) ligand as described below.

Structure 4

The transition metal compound catalysts of Structures 2-4 may further include an N-heterocyclic carbene (NHC) ligand. The NHC ligands may include 4-membered NHC and 5-membered NHC where the NHC ligand may attach to one coordination site of the transition metal compound catalyst. Structures 5-9 are exemplary structures of NHC ligands.

The NHC ligand may be a 4-membered N-heterocyclic carbene ligand. An exemplary structure of 4-membered carbene ligand is depicted in Structure 5. In the following structure, iPr is an isopropyl group.

Structure 5

The NHC ligand may also be a 5-membered N-heterocyclic carbene ligand. An exemplary structure of 5-membered carbene ligands is depicted in Structure 6 and Structure 7. $R^1$ and $R^2$ may be independently selected from 2,4,6-(Me)3C6H2, 2,6-(iPr)2C6H3, cyclohexyl, tert-butyl, 1-adamantyl.

Structure 6

Structure 7

The NHC ligand may be a 5-membered N-heterocyclic carbene ligand. Another exemplary structure of a 5-membered carbene ligand is depicted in Structure 8. $R^1$ and $R^2$ may be equivalent groups and may be selected from $(CH_2)_n$ where n may be 4-7 and 12.

Structure 8

The NHC ligand may be a 5-membered N-heterocyclic carbene ligand. An exemplary structure of 5-membered carbene ligand is depicted in Structure 9. R may be selected between hydrogen and tert-butyl.

Structure 9

The resin-based sealant may further include solvents. Suitable examples of solvents may include, but are not limited to, an alcohol (e.g., isopropyl alcohol, methanol, butanol, and the like); a glycol (e.g., ethylene glycol, propylene glycol, and the like); a glycol ether (e.g., ethyleneglycol monomethyl ether, ethylene glycol monobutylether, and the like); a polyether (e.g., polypropylene glycol); and any combination thereof. Suitable example of solvents may also include but are not limited to hydrocarbon fluids (e.g. base oils, diesel oil, mineral oil, cyclohexane).

The resin-based sealant may further include additional additives. Such additional additives can include, without limitation, particulate materials, fibrous materials, bridging agents, weighting agents, gravel, corrosion inhibitors, catalysts, clay control stabilizers, biocides, bactericides, friction reducers, gases, surfactants, solubilizers, salts, scale inhibitors, foaming agents, anti-foaming agents, iron control agents, and the like.

The resin-based sealant composition may be prepared in any suitable manner, for example, mixing the resin and transition metal compound catalyst in a mixer and conveyed to a downhole location. The resin-based sealant may be applied during remedial operations to repair casing or any structural degradation along the wellbore. The resin-based sealant composition may be used to form a balance plug in a wellbore. The resin-based sealant composition may be placed in a wellbore to plug voids, such as holes or cracks in the pipe strings; holes, cracks, spaces, or channels in the sheath; and very small spaces (commonly referred to as "micro-annuli") between the sheath and the exterior surface of the pipe or wellbore wall. For example, in subterranean well construction, a conduit (e.g., pipe string, casing, liners, expandable tubulars, etc.) may be run into a well bore and cemented in place. Among other things, the sealant sheath surrounding the pipe string functions to prevent the migration of fluids in the annulus, as well as protecting the pipe string, from corrosion.

The resin-based sealant composition may also be incorporated in a cement composition where the cement composition may include the resin-based sealant composition, a cement, and water. Suitable cements may include, but are not limited to, Portland cements, pozzolana cements, gypsum cements, high alumina content cements, silica cements, and any combination thereof. In certain examples, the hydraulic cement may include a Portland cement. In some examples, the Portland cements may include Portland cements that are classified as Classes A, C, H, and G cements according to American Petroleum Institute, *API Specification for Materials and Testing for Well Cements*, API Specification 10, Fifth Ed., Jul. 1, 1990. In addition, hydraulic cements may include cements classified by American Society for Testing and Materials (ASTM) in C150 (Standard Specification for Portland Cement), C595 (Standard Specification for Blended Hydraulic Cement) or C1157 (Performance Specification for Hydraulic Cements) such as those cements classified as ASTM Type I, II, or III.

The cement may be included in the cement composition in any amount suitable for a particular composition. Without limitation, the hydraulic cement may be included in the cement composition in an amount in the range of from about 10% to about 95% by weight of the cement composition. For example, the hydraulic cement may be present in an amount ranging between any of and/or including any of about 10%, about 15%, about 20%, about 25%, about 30%, about 35%, about 40%, about 45%, about 50%, about 55%, about 60%, about 65%, about 70%, about 75%, about 80%, about 85%, or about 90% by weight of the cement composition. In some examples, the cement composition may be considered a "low-Portland" cement where a Portland cement is present in an amount of 50% of less by weight of the cement composition. For example, the composition may include one or more hydraulic cements such as Portland cement in an amount of 50% or less by weight and the balance comprising one or more supplementary cementitious materials such as pozzolanic materials or inert materials including, but not limited to slag, fly ash, natural glasses, silica fume, diatomaceous earth, weighting materials, calcium carbonates, bio ashes, calcined clays, clays, shales, zeolites, and combinations thereof.

The water included in the cement composition may be from any source provided that it does not contain an excess of compounds that may undesirably affect other components in the cement composition. For example, a cement composition may include fresh water or saltwater. Saltwater generally may include one or more dissolved salts therein and may be saturated or unsaturated as desired for a particular application. Seawater or brines may be suitable for use in some examples. Further, the water may be present in an amount sufficient to form a pumpable slurry. In certain examples, the water may be present in the cement composition in an amount in the range of from about 33% to about 200% by weight of the cement composition. For example, the water cement may be present in an amount ranging between any of and/or including any of about 33%, about 50%, about 75%, about 100%, about 125%, about 150%, about 175%, or about 200% by weight of the cement composition.

The cement composition may further include supplementary cementitious materials. The supplementary cementitious material may be any material that contributes to the compressive strength of the cement composition, for example. In some examples, the cement composition may include a variety of fly ashes as a supplementary cementitious material which may include fly ash classified as Class C, Class F, or Class N fly ash according to American Petroleum Institute, API Specification for Materials and Testing for Well Cements, API Specification 10, Fifth Ed., Jul. 1, 1990.

In some examples, the cement composition may further include zeolites as supplementary cementitious materials. Zeolites are generally porous alumino-silicate minerals that may be either natural or synthetic. Synthetic zeolites are based on the same type of structural cell as natural zeolites and may comprise aluminosilicate hydrates. As used herein, the term "zeolite" refers to all natural and synthetic forms of zeolite.

The cement composition may include kiln dust as a supplementary cementitious material. "Kiln dust," as that term is used herein, refers to a solid material generated as a by-product of the heating of certain materials in kilns. The term "kiln dust" as used herein is intended to include kiln dust made as described herein and equivalent forms of kiln dust. Depending on its source, kiln dust may exhibit cementitious properties in that it can set and harden in the presence of water. Examples of suitable kiln dusts include cement kiln dust, lime kiln dust, and combinations thereof. Cement kiln dust may be generated as a by-product of cement production that is removed from the gas stream and collected, for example, in a dust collector. Usually, large quantities of cement kiln dust are collected in the production of cement that are commonly disposed of as waste. The chemical analysis of the cement kiln dust from various cement manufactures varies depending on several factors, including the particular kiln feed, the efficiencies of the cement production operation, and the associated dust collection systems. Cement kiln dust generally may include a variety of oxides, such as $SiO_2$, $Al_2O_3$, $Fe_2O_3$, $CaO$, $MgO$, $SO_3$, $Na_2O$, and $K_2O$. The chemical analysis of lime kiln dust from various lime manufacturers varies depending on several factors, including the particular limestone or dolomitic limestone feed, the type of kiln, the mode of operation of the kiln, the efficiencies of the lime production operation, and the associated dust collection systems. Lime kiln dust generally may include varying amounts of free lime and free magnesium, limestone, and/or dolomitic limestone and a variety of oxides, such as $SiO_2$, $Al_2O_3$, $Fe_2O_3$, $CaO$, $MgO$, $SO_3$, $Na_2O$, and $K_2O$, and other components, such as chlorides. Cement kiln dust may include a partially calcined kiln feed which is removed from the gas stream and collected in a dust collector during the manufacture of cement. The chemical analysis of CKD from various cement manufactures varies depending on several factors, including the particular kiln feed, the efficiencies of the cement production operation, and the associated dust collection systems.

In some examples, the cement composition may further include one or more of perlite, pumice, natural glass, shale, amorphous silica, or metakaolin as a supplementary cementitious material. Slag is generally a granulated, blast furnace by-product from the production of cast iron including the oxidized impurities found in iron ore. Natural glasses may include mineral species which are amorphous glasses such as volcanic rock, for example. The cement may further include perlite. Perlite is an ore and generally refers to a naturally occurring volcanic, amorphous siliceous rock including mostly silicon dioxide and aluminum oxide. The perlite may be expanded and/or unexpanded as suitable for a particular application. The expanded or unexpanded perlite may also be ground, for example. The cement may further include shale. A variety of shales may be suitable, including those including silicon, aluminum, calcium, and/or magnesium. Examples of suitable shales include vitrified shale and/or calcined shale. In some examples, the cement composition may further include amorphous silica as a supplementary cementitious material. Amorphous silica is a powder that may be included in examples to increase cement compressive strength. Amorphous silica is generally a byproduct of a ferrosilicon production process, wherein the amorphous silica may be formed by oxidation and condensation of gaseous silicon suboxide, SiO, which is formed as an intermediate during the process. Metakaolin may be an anhydrous calcined form of the clay mineral kaolinite.

Where used, one or more of the aforementioned supplementary cementitious materials may be present in the cement composition. For example, without limitation, one or more supplementary cementitious materials may be present in an amount of about 0.1% to about 80% by weight of the cement composition. For example, the any of the aforementioned supplementary cementitious materials may be present in an amount ranging between any of and/or including any of about 10%, about 15%, about 20%, about 25%, about 30%, about 35%, about 40%, about 45%, about 50%, about 55%, about 60%, about 65%, about 70%, about 75%, or about 80% by weight of the cement composition.

In some examples, the cement composition may further include hydrated lime. As used herein, the term "hydrated lime" will be understood to mean calcium hydroxide. In some examples, the hydrated lime may be provided as quicklime (calcium oxide) which hydrates when mixed with water to form the hydrated lime. The hydrated lime may be included in examples of the cement composition, for example, to form a hydraulic composition with one or more supplementary cementitious materials. For example, the hydrated lime may be included in a supplementary cementitious material-to-hydrated-lime weight ratio of about 10:1 to about 1:1 or 3:1 to about 5:1. Where present, the hydrated lime may be included in the cement composition in an amount in the range of from about 10% to about 100% by weight of the cement composition, for example. In some examples, the hydrated lime may be present in an amount ranging between any of and/or including any of about 10%, about 20%, about 40%, about 60%, about 80%, or about 100% by weight of the cement composition.

Other additives suitable for use in subterranean cementing operations also may be included in embodiments of the cement composition. Examples of such additives include, but are not limited to weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. In some examples, the cement composition may further include a dispersant. Examples of suitable dispersants include, without limitation, sulfonated-formaldehyde-based dispersants (e.g., sulfonated acetone formaldehyde condensate) or polycarboxylated ether dispersants. In some examples, the dispersant may be included in the cement composition in an amount in the range of from about 0.01% to about 5% by weight of the cement composition. In specific examples, the dispersant may be present in an amount ranging between any of and/or including any of about 0.01%, about 0.1%, about 0.5%, about 1%, about 2%, about 3%, about 4%, or about 5% by weight of the cement composition.

In some examples, the cement composition may further include a set retarder. A broad variety of set retarders may be suitable for use in the cement composition. For example, the set retarder may comprise phosphonic acids, such as ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or terpolymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable set retarders include, among others, phosphonic acid derivatives. Generally, the set retarder may be present in the cement composition in an amount sufficient to delay the setting for a desired time. In some examples, the set retarder may be present in the cement composition in an amount in the range of from about 0.01% to about 10% by weight of the cement composition. In specific examples, the set retarder may be present in an amount ranging between any of and/or including any of about 0.01%, about 0.1%, about 1%, about 2%, about 4%, about 6%, about 8%, or about 10% by weight of the cement composition.

Cement compositions generally should have a density suitable for a particular application. By way of example, the cement composition may have a density in the range of from about 4 pounds per gallon ("lbm/gal") (1677.6 kg/m$^3$) to about 20 lbm/gal (2369.5 kg/m$^3$). In certain examples, the cement composition may have a density in the range of from about 8 lbm/gal (958.6 kg/m$^3$) to about 17 lbm/gal (2037 kg/m$^3$) or about 8 lbm/gal (958.6 kg/m$^3$) to about 14 lbm/gal (1677.6 kg/m$^3$). Examples of the cement compositions may be foamed or unfoamed or may comprise other means to reduce their densities, such as hollow microspheres, low-density elastic beads, or other density-reducing additives known in the art. In examples, the density of the cement composition may be reduced prior to placement in a subterranean formation.

In some examples, the cement compositions may set to have a desirable compressive strength after activation. Compressive strength is generally the capacity of a material or structure to withstand axially directed pushing forces. The compressive strength may be measured at a specified time after the cement composition has been mixed and the resultant composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ ultrasonic cement analyzer, available from Fann Instrument Company, Houston, Tex. Compressive strength values may be determined in accordance with API RP 10B-2 "Testing Well Cements", 2nd Edition. Published April 2013.

By way of example, the cement compositions may develop a 24-hour compressive strength in the range of from about 50 psi (345 kPa) to about 5000 psi (34473 kPa), alternatively, from about 100 psi (689 kPa) to about 4500 psi (31026 kPa), or alternatively from about 500 psi (3447 kPa) to about 4000 psi (27579 kPa). In some examples, the cement composition may develop a compressive strength in 24 hours of at least about 50 psi (345 kPa), at least about 100 psi (689 kPa), at least about 500 psi (3447 kPa), or more. In some examples, the compressive strength values may be determined using destructive or non-destructive methods at a temperature ranging from 100° F. (37° C.) to 200° F. (93° C.).

The cement composition may have desirable thickening times after activation. Thickening time typically refers to the time a fluid, such as the cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. In some examples, the cement compositions may have a thickening time of greater than about 1 hour, alternatively, greater than about 2 hours, alternatively greater than about 5 hours at 3,000 psi.

Figure 1:
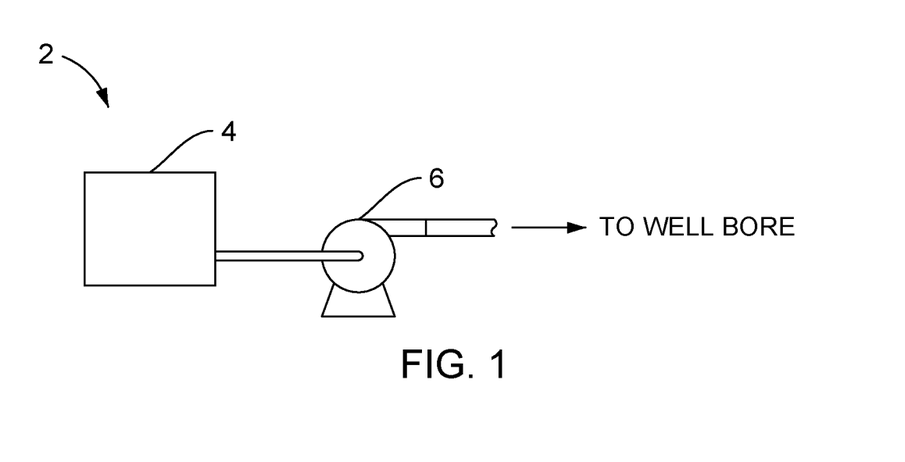
FIG. 1 is a schematic view that illustrates a system for preparation and delivery of a cement composition to a wellbore.

FIG. 1 illustrates system 2 for preparation of a cement composition and delivery to a wellbore in accordance with certain embodiments. As shown, the cement composition may be mixed in mixing equipment 4, such as a jet mixer, re-circulating mixer, or a batch mixer, for example, and then pumped via pumping equipment 6 to the wellbore. In some embodiments, mixing equipment 4 and pumping equipment 6 may be disposed on one or more cement. In some embodiments, a jet mixer may be used, for example, to continuously mix the cement composition with the water as it is being pumped to the wellbore. In set-delayed embodiments, a re-circulating mixer and/or a batch mixer may be used to mix the set-delayed cement composition, and the activator may be added to the mixer as a powder prior to pumping the cement composition downhole.

Figure 2:
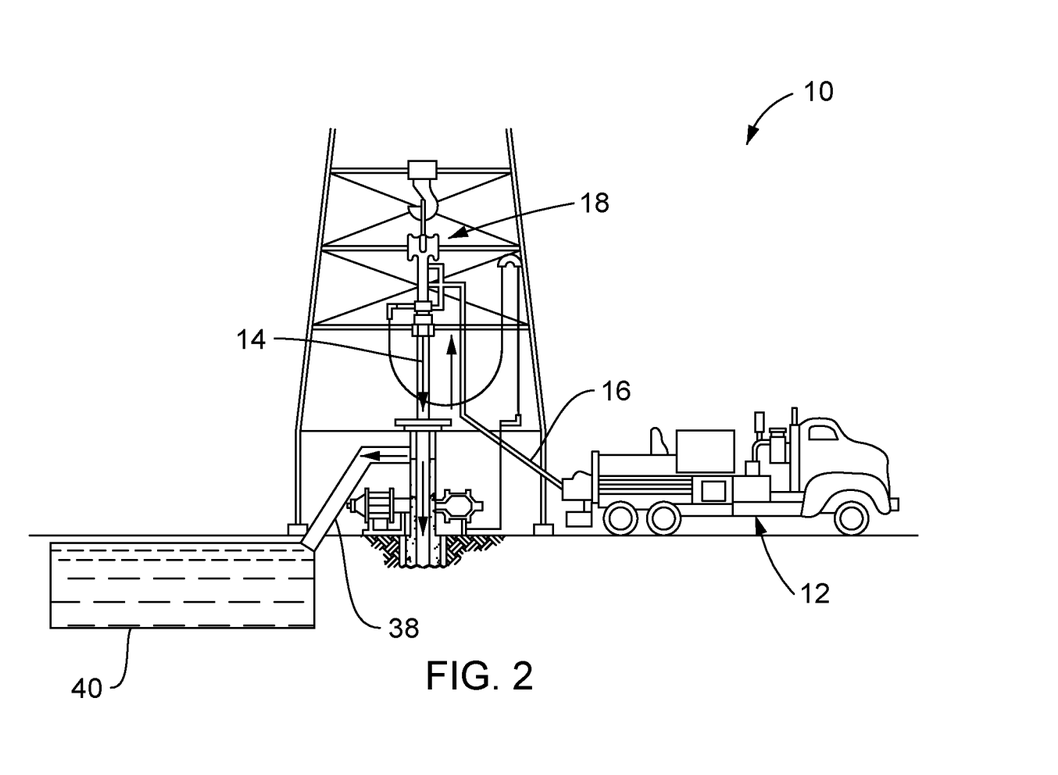
FIG. 2 is a schematic view that illustrates surface equipment that may be used in placement of a cement composition in a wellbore.

FIG. 2 illustrates surface equipment 10 that may be used in placement of a cement composition in accordance with certain embodiments. It should be noted that while FIG. 2 generally depicts a land-based operation, the principles described herein are equally applicable to subsea operations that employ floating or sea-based platforms and rigs, without departing from the scope of the disclosure. As illustrated by FIG. 2, surface equipment 10 may include cementing unit 12, which may include one or more cement trucks. Cementing unit 12 may include mixing equipment 4 and pumping equipment 6 (e.g., FIG. 1). Cementing unit 12 may pump cement composition 14 through feed pipe 16 and to cementing head 18 which conveys cement composition 14 downhole.

Figure 3:
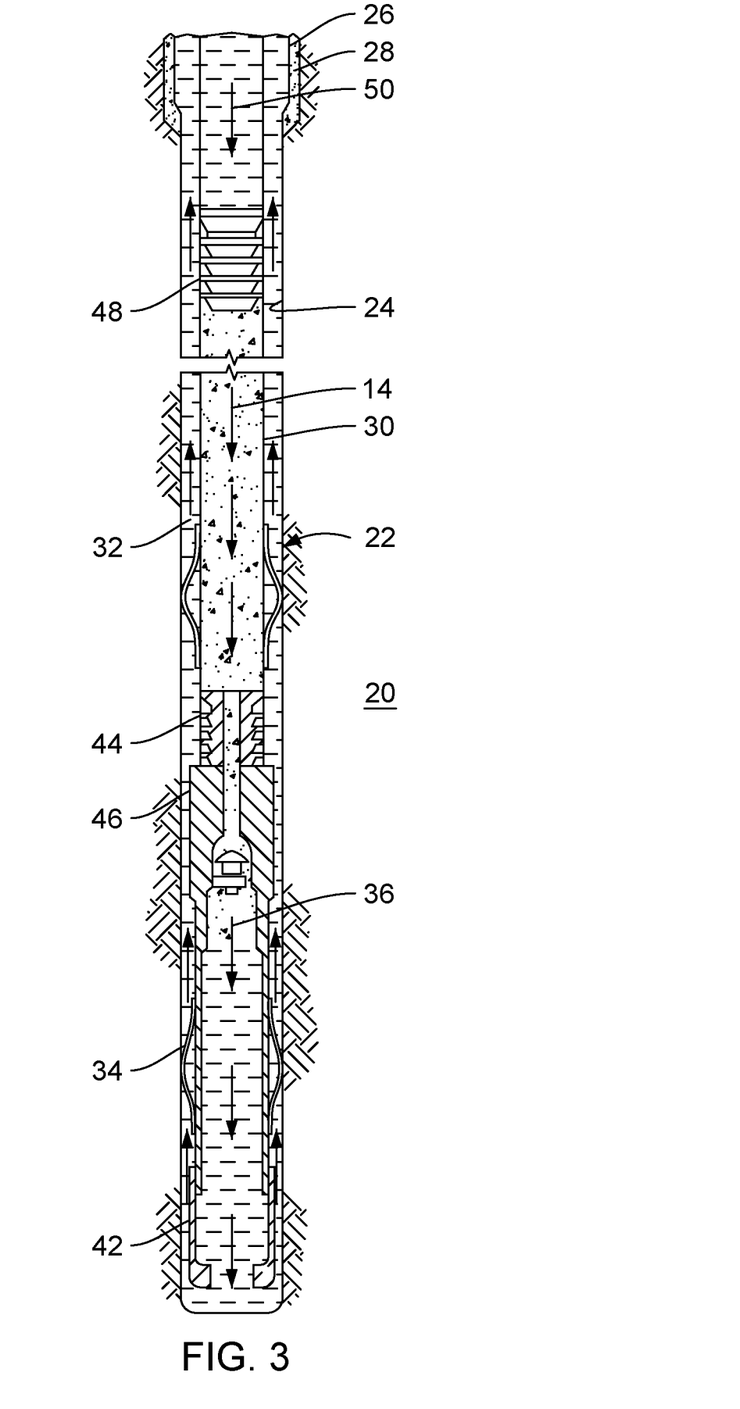
FIG. 3 is a schematic view that illustrates placement of a cement composition into a wellbore annulus.

FIG. 3 illustrates placement of a cement composition into wellbore annulus 32. Cement composition 14 may be placed into subterranean formation 20 in accordance with example embodiments. As illustrated, wellbore 22 may be drilled into subterranean formation 20. While wellbore 22 is shown extending generally vertically into subterranean formation 20, the principles described herein are also applicable to wellbores that extend at an angle through subterranean formation 20, such as horizontal and slanted wellbores. As illustrated, wellbore 22 comprises walls 24. In the illustrated embodiment, surface casing 26 has been inserted into wellbore 22. Surface casing 26 may be cemented to walls 24 of wellbore 22 by cement sheath 28. In the illustrated embodiment, one or more additional conduits (e.g., intermediate casing, production casing, liners, etc.), shown here as casing 30 may also be disposed in wellbore 22. As illustrated, wellbore annulus 32 is formed between casing 30 and walls 24 of wellbore 22 and/or surface casing 26. One or more centralizers 34 may be attached to casing 30, for example, to centralize casing 30 in wellbore 22 prior to and during the cementing operation.

With continued reference to FIG. 3, cement composition 14 may be pumped down the interior of casing 30. Cement composition 14 may be allowed to flow down the interior of casing 30 through casing shoe 42 at the bottom of casing 30 and up around casing 30 into wellbore annulus 32. Cement composition 14 may be allowed to set in wellbore annulus 32, for example, to form a cement sheath that supports and positions casing 30 in wellbore 22. While not illustrated, other techniques may also be utilized for introduction of cement composition 14. By way of example, reverse circulation techniques may be used that include introducing cement composition 14 into subterranean formation 20 by way of wellbore annulus 32 instead of through casing 30.

As it is introduced, cement composition 14 may displace other fluids 36, such as drilling fluids and/or spacer fluids that may be present in the interior of casing 30 and/or wellbore annulus 32. At least a portion of displaced fluids 36 may exit wellbore annulus 32 via flow line 38 and be deposited, for example, in one or more retention pits 40 (e.g., a mud pit), as shown on FIG. 2. Referring again to FIG. 3, bottom plug 44 may be introduced into wellbore 22 ahead of cement composition 14, for example, to separate cement composition 14 from fluids 36 that may be inside casing 30 prior to cementing. After bottom plug 44 reaches landing collar 46, a diaphragm or other suitable device should rupture to allow cement composition 14 through bottom plug 44. In FIG. 3, bottom plug 44 is shown on landing collar 46. In the illustrated embodiment, top plug 48 may be introduced into wellbore 22 behind cement composition 14. Top plug 48 may separate cement composition 14 from displacement fluid 50 and also push cement composition 14 through bottom plug 44.

Figure 4:
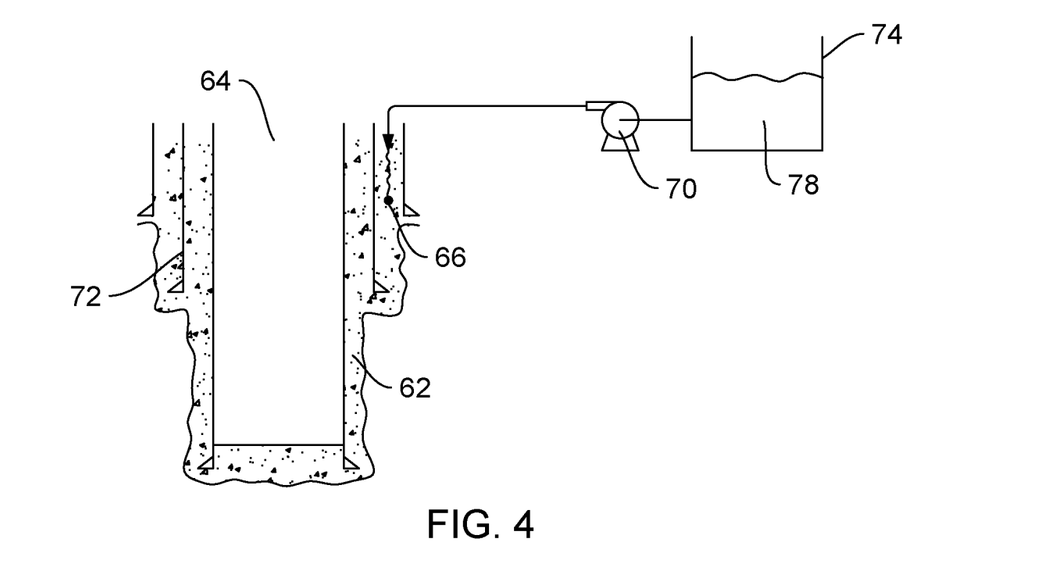
FIG. 4 is a schematic view that illustrates placement of a resin-based sealant in a wellbore.

FIG. 4 illustrates placement of resin-based sealant composition 78 into wellbore 64 In FIG. 4, wellbore 64 is shown having one or more conduits 72 disposed in wellbore 64 and supported and positioned in wellbore 64 by cement sheath 62. As illustrated, defect 66 may cause gas to propagate through the cracks in the casing and/or cement sheath 62. Resin-based sealant composition 78 may be prepared at the surface in vessel 74 and introduced into wellbore 64 by pump 70 to stop gas migration. Resin-based sealant composition 78 may be pumped into wellbore 64 directly into one of the annuli of wellbore 64 such as annuli surrounding, the central casing, production tubing, control lines, and/or tubing containing fiber optic filament.

Figure 5:
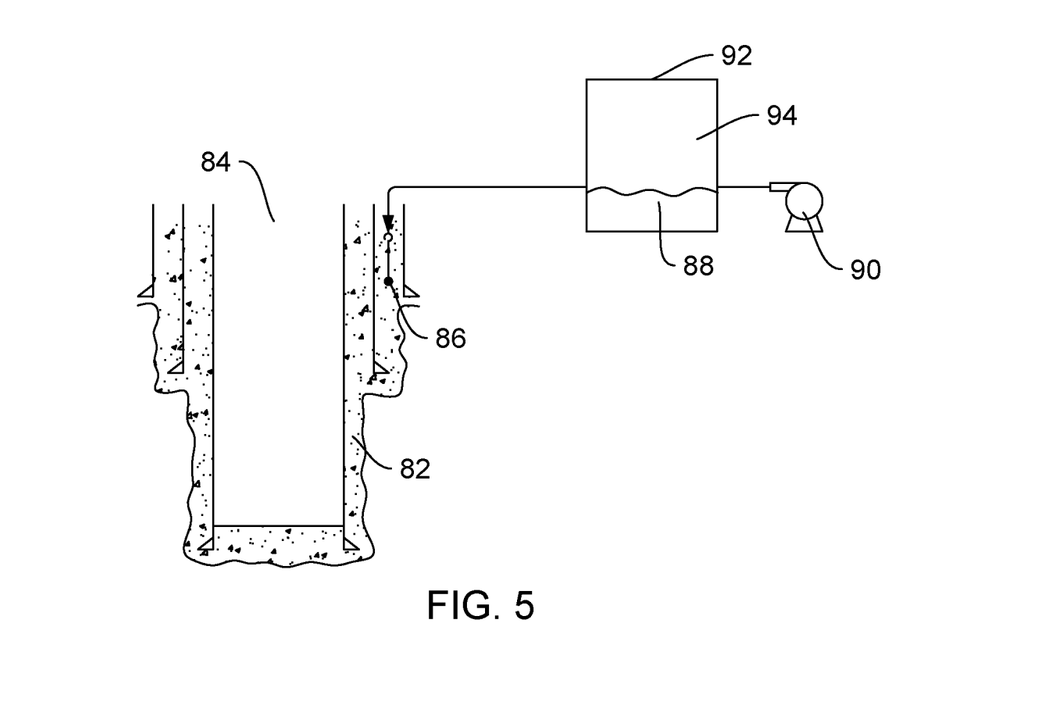
FIG. 5 is a schematic view that illustrates placement of a resin-based sealant in a wellbore.

FIG. 5 illustrates placement of resin-based sealant composition 94 into wellbore 84 including cement sheath 82. In FIG. 5, resin-based sealant composition 94 (e.g., resin and transition metal compound catalyst) may be mixed and placed in pressure vessel 92 prior to introduction into wellbore 84. Pressure vessel 92 may be connected to a wellbore annulus 96, such as an annulus surrounding the central casing, production tubing, control lines, and/or tubing containing fiber optic filament. Pressure may be applied to pressure vessel 92 by pump 90 to force resin-based sealant composition 94 into wellbore annulus 96 to mitigate defect 86. If displacement fluid 88 is heavier than resin-based sealant composition 94, displacement fluid 88 can be pumped into the bottom of pressure vessel 92 to force resin-based sealant composition 94 out of the top and vice versa. Pressure vessel 92 may be a closed ended pipe with ports for fluid entry and exit. Pressure vessel 92 may be disposable.

Figure 6A:
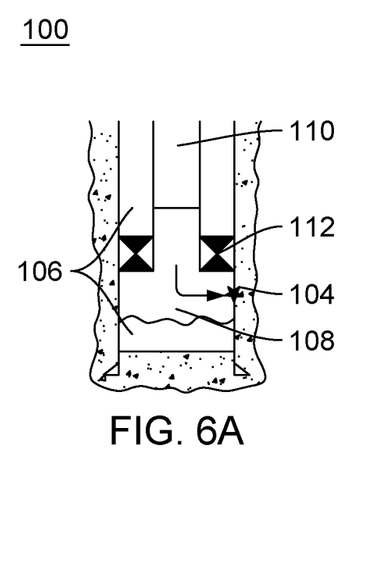
FIGS. 6A and 6B are schematic views that illustrate placement of a resin-based sealant in a wellbore.
Figure 6B:
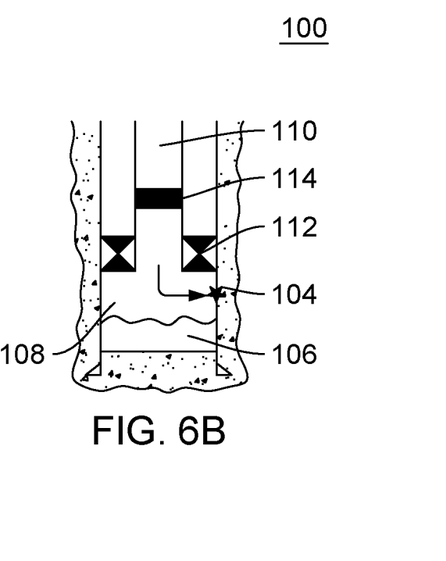

FIGS. 6A and 6B placement of resin-based sealant composition 108 into wellbore 100. In FIGS. 6A and 6B, resin-based sealant composition 108 may be used to seal defect 104 in wellbore 100. As illustrated, retainer 112 may be set in wellbore 100 above defect 104 to isolate the annulus and defect 104. Wellbore fluid 106 may present in wellbore 100. In some examples, wellbore fluid 106 may have a density higher than resin-based sealant composition 108. In this example, resin-based sealant composition 108 may be spotted to the end of a work string into wellbore 100 to a volume below retainer 112. After spotting resin-based sealant composition 108 below retainer 112, resin-based sealant composition 108 may be further displaced by displacement fluid 110 into defect 104 by application of pressure, for example, by a surface pump. If there is no mechanical separation between displacement fluid 110 and resin-based sealant composition 108, displacement fluid 110 should have a lower density. FIG. 6B illustrates an example where resin-based sealant composition 108 has a lower density than displacement fluid 110, necessitating plug 114 being disposed between displacement fluid 110 and resin-based sealant composition 108.

Figure 7:
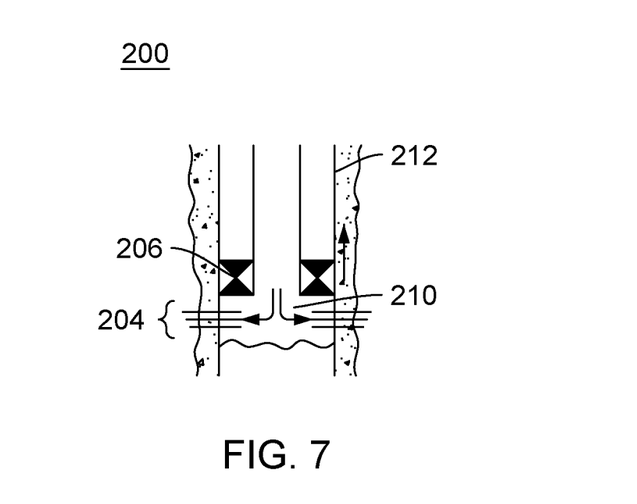
FIG. 7 is a schematic view that illustrates placement of a resin-based sealant in a wellbore.

FIG. 7 illustrates placement of a resin-based sealant composition 210 into wellbore 200 during sustained pressure operations such as fracturing, sand control, consolidation, gravel packing, or similar wellbore operations. FIG. 7 illustrates resin-based sealant composition 210 flowing into opening 204. Opening 204 may include perforations, punches, section-milled windows with intersecting fluid flow paths behind casing 212. Wellbore 200 may be isolated by packer set 206.

Figure 8A:
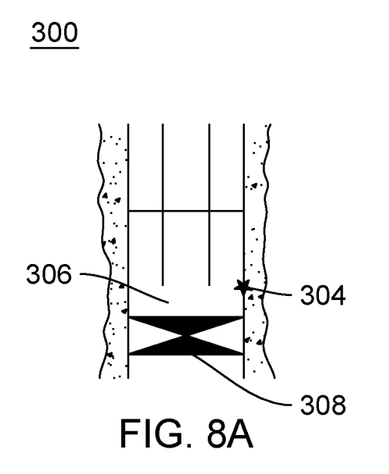
FIGS. 8A and 8B are schematic views that illustrate placement of a resin-based sealant.
Figure 8B:
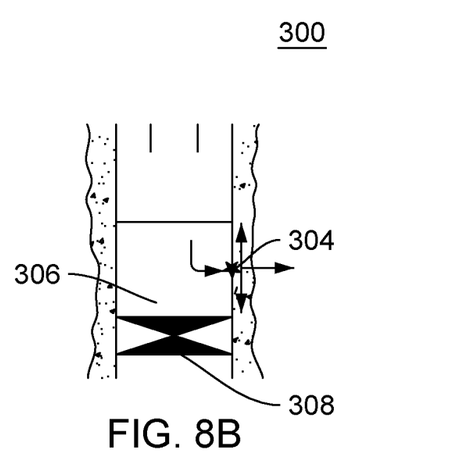

FIGS. 8A and 8B illustrate an alternative example where resin-based sealant composition 306 may be placed as balanced plug 308 into wellbore 300 with a defect 304 such as a casing leak for sustained casing pressure. Balanced plug 308, which may comprise of a hardened resin-based sealant composition may provide a pressure isolation to treat a defect 304. While not shown, resin-based sealant composition 306 may be placed using a pump and pull method in which a work string is used to place resin-based sealant composition 306 into wellbore 300.

Figure 9A:
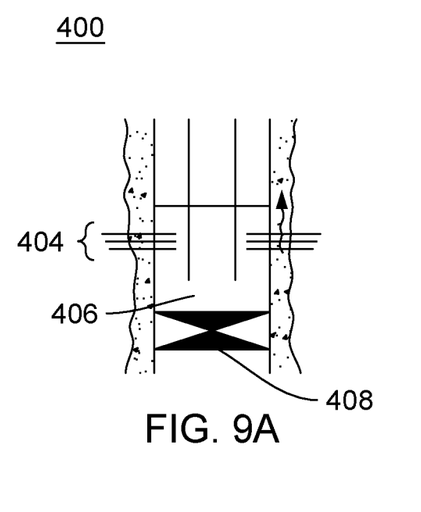
FIGS. 9A and 9B are schematic views that illustrate placement of a resin-based sealant.
Figure 9B:
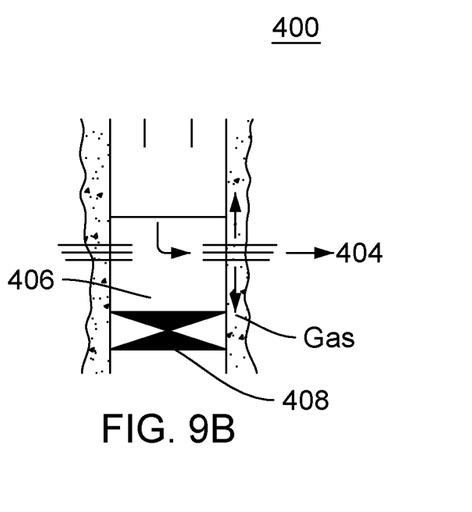

FIGS. 9A and 9B illustrate an alternative example where resin-based sealant composition 406 may be placed as balanced plug 408 into wellbore 400 with gas migration from perforations 404. Balanced plug 408, which may comprise of a hardened resin-based sealant composition, may provide a pressure isolation to treat gas migration. While not shown, resin-based sealant composition 406 may be placed using a pump and pull method in which a work string is used to place resin-based sealant composition 406 into wellbore 400.

Accordingly, the present disclosure may provide methods relating to resin-based sealant compositions and methods of use in servicing wellbores. The methods may include any of the various features disclosed herein, including one or more of the following statements:

Statement 1: A method comprising: introducing into a wellbore a resin-based sealant composition comprising: a resin comprising a cycloalkene; and a transition metal compound catalyst; and allowing the resin-based sealant composition to harden in the wellbore.

Statement 2: The method of statement 1, wherein the cycloalkene is selected from the group consisting of cyclopentadiene, dicyclopentadiene, tricyclopentadiene, cyclobutadiene, cyclobutadiene derivatives, cyclohexadiene, terpinene, norbornadiene, isomers thereof, and combinations thereof.

Statement 3: The method of any of statements 1-2, wherein the transition metal compound catalyst comprises a catalyst having a structure selected from the group of:

where M is ruthenium or osmium, R and R1 are independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl, X and X1 are each an anionic ligand, L and L1 are each a neutral electron donor, and NHC is an N-heterocyclic carbene ligand.

Statement 4: The method of any of statements 1-3, wherein R and R1 are each substituted with a C1-C5 alkyl group, a halogen, a C1-C5 alkoxy group or a phenyl group, wherein the phenyl group is further unsubstituted or substituted with a C1-C5 alkyl group, a halogen, or a C1-C5 alkoxy group.

Statement 5: The method of any of statements 1-4, wherein the resin and the transition metal compound catalyst are present in a mass ratio of about 50:1 to about 10000:1 of the resin to the transition metal compound catalyst.

Statement 6: The method of any of statements 1-5, wherein the cycloalkene is present in an amount of about 50 wt. % to about 99.5 wt. % of the resin-based sealant composition.

Statement 7: The method of any of statements 1-6, wherein the transition metal compound catalyst is present in an amount of about 0.001 wt. % to about 2 wt. % of the resin-based sealant composition.

Statement 8: The method of any of statements 1-7, further comprising placing the hardened resin-based sealant in the wellbore composition as a balanced plug to treat sustained casing pressure.

Statement 9: The method of any of statements 1-8, wherein the transition metal compound catalyst comprises a ruthenium carbene compound.

Statement 10: The method of any of statements 1-9, wherein the wellbore is at a temperature of 38° C. or less.

Statement 11: The method of any of statements 1-10, wherein the cycloalkene is a cycloalkene blend comprising 90% dicyclopentadiene and 30% tricyclopentadiene, and wherein the transition metal compound catalyst comprises a ruthenium carbene compound.

Statement 12: A method comprising: introducing a resin-based sealant composition into a wellbore comprising a defect, wherein the resin-based sealant composition comprises: a resin comprising a cycloalkene; and a transition metal compound catalyst; allowing the resin-based sealant composition to harden in the wellbore.

Statement 13: The method of statement 12, wherein the introducing comprises pumping the resin-based sealant composition followed by a displacement fluid.

Statement 14: The method of any of statements 12-13, wherein the cycloalkene is selected from the group consisting of cyclopentadiene, dicyclopentadiene, tricyclopentadiene, cyclobutadiene, cyclobutadiene derivatives, cyclohexadiene, terpinene, norbornadiene, isomers thereof, and combinations thereof.

Statement 15: The method of any of statements 12-14, wherein the transition metal compound catalyst comprises a catalyst having a structure selected from the group of:

where M is ruthenium or osmium, R and R1 are independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl, X and X1 are each an anionic ligand, L and L1 are each a neutral electron donor, and NHC is an N-heterocyclic carbene ligand.

Statement 16: The method of any of statements 12-15, wherein the cycloalkene is a cycloalkene blend comprising 90% dicyclopentadiene and 30% tricyclopentadiene, and wherein the transition metal compound catalyst comprises a ruthenium carbene compound.

Statement 17: A method comprising: introducing into a wellbore a cement composition comprising: a resin-based sealant composition comprising: a resin comprising a cycloalkene; and a transition metal compound catalyst; a cement; and water; and allowing the cement composition to set in the wellbore.

Statement 18: The method of claim 17, wherein the cycloalkene is a cycloalkadiene selected from the group consisting of cyclopentadiene, dicyclopentadiene, tricyclopentadiene, cyclobutadiene, cyclobutadiene derivatives, cyclohexadiene, terpinene, norbornadiene, isomers thereof, and combinations thereof.

Statement 19: The method of claim 17-18, wherein the resin and the transition metal compound catalyst are present in a mass ratio of about 50:1 to about 10000:1 of the resin to the transition metal compound catalyst.

Statement 20: The method of claim 17-19, wherein the transition metal compound catalyst comprises a catalyst having a structure selected from the group of:

where M is ruthenium or osmium, R and R1 are independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl, X and X1 are each an anionic ligand, L and L1 are each a neutral electron donor, and NHC is an N-heterocyclic carbene ligand.

EXAMPLES

To facilitate a better understanding of the present invention, the following examples of certain aspects of some examples are given. In no way should the following examples be read to limit, or define, the entire scope of the invention.

Example 1

Figure 10:
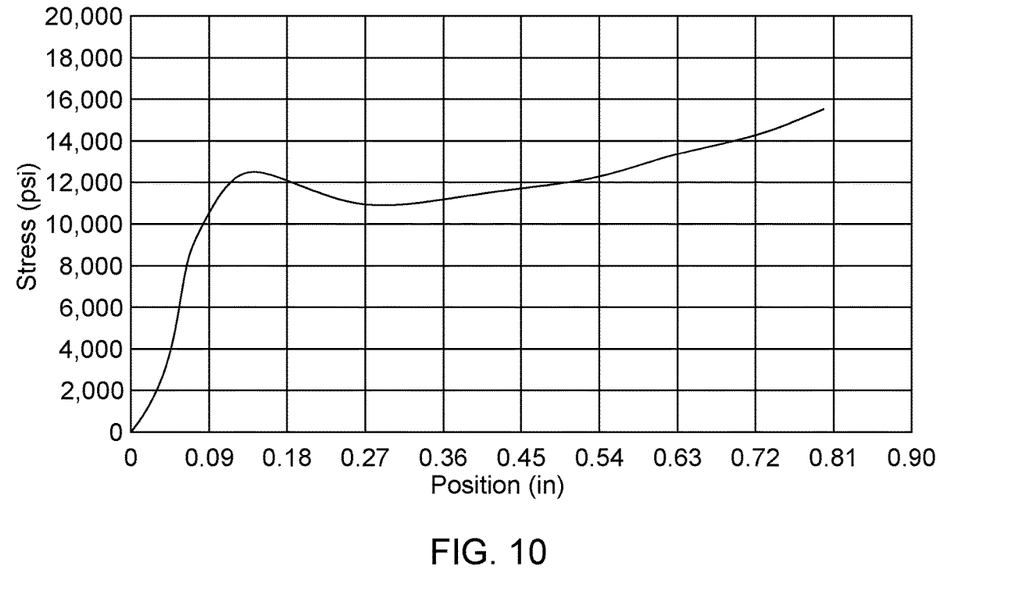
FIG. 10 is a graph of results of a stress-strain test.

In this example, a stress-strain test was performed for a resin-based sealant composition. A 50:1 mass ratio of resin to transition metal compound catalyst suspension in a white mineral oil was used. A commercial resin, Resin-1, with a cycloalkene blend of dicyclopentadiene (<90%) and tricyclopentadiene (<30%) was used. A commercial transition metal compound catalyst with a ruthenium carbene compound, Cat-1, was used. Cylindrical specimens were prepared with a length to diameter ratio of 2:1. By way of example, the length of the specimen was approximately 2 inches, and the diameter of the specimen was approximately 1 inch. The test was controlled for displacement with a platen on a load frame compressing at a rate of 0.2 inches per minute. The results of the stress-strain test are showing in FIG. 10. It was observed that the reaction time to convert from liquid to cured solid was approximately 5 minutes at room temperature.

Example 2

Figure 11:
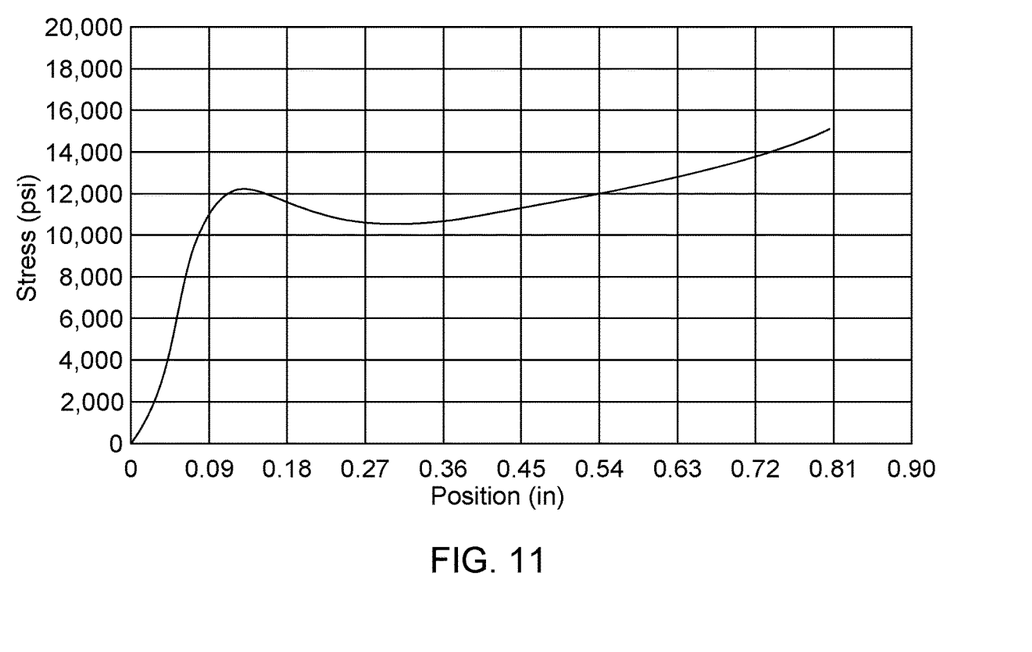
FIG. 11 is a graph of results of a stress-strain test.

In this example, a stress-strain test was performed for a resin-based sealant composition. A 50:1 mass ratio of resin to transition metal compound catalyst suspension in white mineral oil was used. A commercial resin, Resin-1, with a cycloalkene blend of dicyclopentadiene (<90%), and tricyclopentadiene (<30%) was used. A commercial transition metal compound catalyst with a ruthenium carbene compound, Cat-2, was used. Cylindrical specimens were prepared with a length to diameter ratio of 2:1. The length of the specimen was approximately 2 inches, and the diameter of the specimen was approximately 1 inch. The test was controlled for displacement with a platen on a load frame compressing at a rate of 0.2 inches per minute. The results of the stress-strain test are shown in FIG. 11. It was observed that the reaction time to convert from liquid to cured solid was approximately 2 hours at room temperature.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, as the present examples may be modified and practiced in different but equivalent manners. Although individual examples are discussed, all combinations of each example are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method comprising:
introducing into a wellbore a resin-based sealant composition comprising:
a resin comprising a cycloalkene; and
a transition metal compound catalyst;
wherein the transition metal compound catalyst comprises a catalyst having a structure selected from the group consisting of:

Structure 1

Structure 2

Structure 3

Structure 4 where M is ruthenium or osmium, R and R1 are independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl, X and X1 are each an anionic ligand, L and L1 are each a neutral electron donor, and NHC is an N-heterocyclic carbene ligand; and
allowing the resin-based sealant composition to harden in the wellbore.

2. The method of claim 1, wherein the cycloalkene is selected from the group consisting of cyclopentadiene, dicyclopentadiene, tricyclopentadiene, cyclobutadiene, cyclobutadiene derivatives, cyclohexadiene, terpinene, norbornadiene, isomers thereof, and combinations thereof.

3. The method of claim 1, wherein R and R1 are each substituted with a C1-C5 alkyl group, a halogen, a C1-C5 alkoxy group or a phenyl group, wherein the phenyl group is further unsubstituted or substituted with a C1-C5 alkyl group, a halogen, or a C1-C5 alkoxy group.

4. The method of claim 1, wherein the resin and the transition metal compound catalyst are present in a mass ratio of about 50:1 to about 10000:1 of the resin to the transition metal compound catalyst.

5. The method of claim 1, wherein the cycloalkene is present in an amount of about 50 wt. % to about 99.5 wt. % of the resin-based sealant composition.

6. The method of claim 1, wherein the transition metal compound catalyst is present in an amount of about 0.001 wt. % to about 2 wt. % of the resin-based sealant composition.

7. The method of claim 1, further comprising placing the resin-based sealant composition in the wellbore as a balanced plug to treat sustained casing pressure.

8. The method of claim 4, wherein the transition metal compound catalyst comprises a ruthenium carbene compound.

9. The method of claim 1, wherein the wellbore is at a temperature of 38° C. or less.

10. The method of claim 1, wherein the cycloalkene is a cycloalkene blend comprising 90% dicyclopentadiene and 30% tricyclopentadiene, and wherein the transition metal compound catalyst comprises a ruthenium carbene compound.

11. A method comprising:
introducing a resin-based sealant composition into a wellbore comprising a defect, wherein the resin-based sealant composition comprises:
a resin comprising a cycloalkene; and a transition metal compound catalyst;
wherein the transition metal compound catalyst comprises a catalyst having a structure selected from the group consisting of:

Structure 1

Structure 2

Structure 3

Structure 4 where M is ruthenium or osmium, R and R1 are independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl, X and X1 are each an anionic ligand, L and L1 are each a neutral electron donor, and NHC is an N-heterocyclic carbene ligand; and allowing the resin-based sealant composition to harden in the wellbore.

12. The method of claim 11, wherein the step of introducing comprises pumping the resin-based sealant composition followed by a displacement fluid.

13. The method of claim 11, wherein the cycloalkene is selected from the group consisting of cyclopentadiene, dicyclopentadiene, tricyclopentadiene, cyclobutadiene, cyclobutadiene derivatives, cyclohexadiene, terpinene, norbornadiene, isomers thereof, and combinations thereof.

14. The method of claim 11, wherein the cycloalkene is a cycloalkene blend comprising 90% dicyclopentadiene and 30% tricyclopentadiene, and wherein the transition metal compound catalyst comprises a ruthenium carbene compound.

15. A method comprising:
introducing into a wellbore a cement composition comprising:
a resin-based sealant composition comprising:
a resin comprising a cycloalkene; and
a transition metal compound catalyst;
a cement; and
water; and
allowing the cement composition to set in the wellbore.

16. The method of claim 15, wherein the cycloalkene is a cycloalkadiene selected from the group consisting of cyclopentadiene, dicyclopentadiene, tricyclopentadiene, cyclobutadiene, cyclobutadiene derivatives, cyclohexadiene, terpinene, norbornadiene, isomers thereof, and combinations thereof.

17. The method of claim 15, wherein the resin and the transition metal compound catalyst are present in a mass ratio of about 50:1 to about 10000:1 of the resin to the transition metal compound catalyst.

18. The method of claim 15, wherein the transition metal compound catalyst comprises a catalyst having a structure selected from the group of:

Structure 1

Structure 2

Structure 3

Structure 4 where M is ruthenium or osmium, R and R1 are independently selected from hydrogen, C2-C20 alkenyl, C2-C20 alkynyl, C2-C20 alkyl, aryl, C1-C20 carboxylate, C1-C20 alkoxy, C2-C20 alkenyloxy, C2-C20 alkynyloxy, aryloxy, C2-C20 alkoxycarbonyl, C1-C20 alkylthio, C1-C20 alkylsulfonyl or C1-C20 alkyl sulfinyl, X and X1 are each an anionic ligand, L and L1 are each a neutral electron donor, and NHC is an N-heterocyclic carbene ligand.

* * * * *